US011270494B2

(12) United States Patent
Gillig

(10) Patent No.: US 11,270,494 B2
(45) Date of Patent: Mar. 8, 2022

(54) SHADOW CULLING

(71) Applicant: Microsoft Technology Licensing, LLC, Redmond, WA (US)

(72) Inventor: Remi Gillig, Leicestershire (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/882,065

(22) Filed: May 22, 2020

(65) Prior Publication Data
US 2021/0366176 A1    Nov. 25, 2021

(51) Int. Cl.
*G06T 15/04* (2011.01)
*G06T 15/60* (2006.01)
*G06T 15/40* (2011.01)
*G06T 15/80* (2011.01)

(52) U.S. Cl.
CPC ............ *G06T 15/04* (2013.01); *G06T 15/405* (2013.01); *G06T 15/60* (2013.01); *G06T 15/80* (2013.01)

(58) Field of Classification Search
None
See application file for complete search history.

(56) References Cited

U.S. PATENT DOCUMENTS

2010/0295851 A1* 11/2010 Diamand .............. G06T 15/60
                                                345/422
2015/0097857 A1    4/2015 Akenine-Moller et al.
2016/0203635 A1    7/2016 Wyman et al.
2018/0268604 A1    9/2018 Story
2020/0098078 A1    3/2020 Bujewski et al.

FOREIGN PATENT DOCUMENTS

GB          2476140 A        6/2011

OTHER PUBLICATIONS

Eisemann, et al., "Fast Scene Voxelization and Applications", In ACM SIGGRAPH Symposium on Interactive 3D Graphics and Games, Mar. 14, 2006, 9 Pages.
Mccool, Michael D., "Shadow Volume Reconstruction from Depth Maps", In Journal of ACM Transactions on Graphics, Jan. 2001, pp. 1-24.
Mcguire, Morgan., "Efficient Shadow Volume Rendering", In Publication of Addison-Wesley, Mar. 2004, 27 pages.
Zhang, et al., Parallel-Split Shadow Maps on Programmable GPUs, In GPU gems, 2007, 33 Pages.
(Continued)

*Primary Examiner* — Nurun N Flora
(74) *Attorney, Agent, or Firm* — Rainier Patents, P.S.

(57) ABSTRACT

The present concepts relate to shadow culling when rendering a 3D computer graphics virtual world. A depth buffer may be rendered from the perspective of a camera, and the depth buffer can be used to generate a hit map, which can be used to determine which objects in the world will need shadow tests. When shadow maps are generated by rendering multiple cascades from the perspective of a light, rather than including all objects in a particular cascade into the shadow map, the pixels in the hit map corresponding to an object are checked to determine whether a shadow test will be needed for the object. If the object will not contribute to the main scene, then the object is excluded from the shadow map, thus saving GPU processing resources.

20 Claims, 7 Drawing Sheets

(56) References Cited

OTHER PUBLICATIONS

Bittner, et al., "Shadow Caster Culling for Efficient Shadow Mapping", In Symposium on Interactive 3d Graphics and Games 2011, Feb. 18, 2011, pp. 81-88.
Kolivand, et al., "Shadow Mapping Algorithms: Applications and Limitations", In Applied Mathematics & Information Sciences, vol. 9, Issue 3, May 1, 2015, pp. 1307-1315.
"International Search Report, and Written Opinion issued in PCT Application No. PCT/US21/026743", dated Jul. 20, 2021, 12 Pages.
Silvennoinen, A., "Chasing Shadows", In Game Developer Magazine, Feb. 1, 2012, pp. 49-53.

* cited by examiner

SHADOW CULLING

BACKGROUND

Displaying 3-dimensional ("3D") computer graphics can be a processor-intensive task, especially where a virtual 3D world includes many objects that need shadows rendered.

BRIEF DESCRIPTION OF THE DRAWINGS

The accompanying drawings illustrate implementations of the present concepts. Features of the illustrated implementations can be more readily understood by reference to the following descriptions in conjunction with the accompanying drawings. Like reference numbers in the various drawings are used where feasible to indicate like elements. The accompanying drawings are not necessarily drawn to scale. In the figures, the left-most digit of a reference number identifies the figure in which the reference number first appears. The use of similar reference numbers in different instances in the description and the figures may indicate similar or identical items.

DETAILED DESCRIPTION

Figure 1:
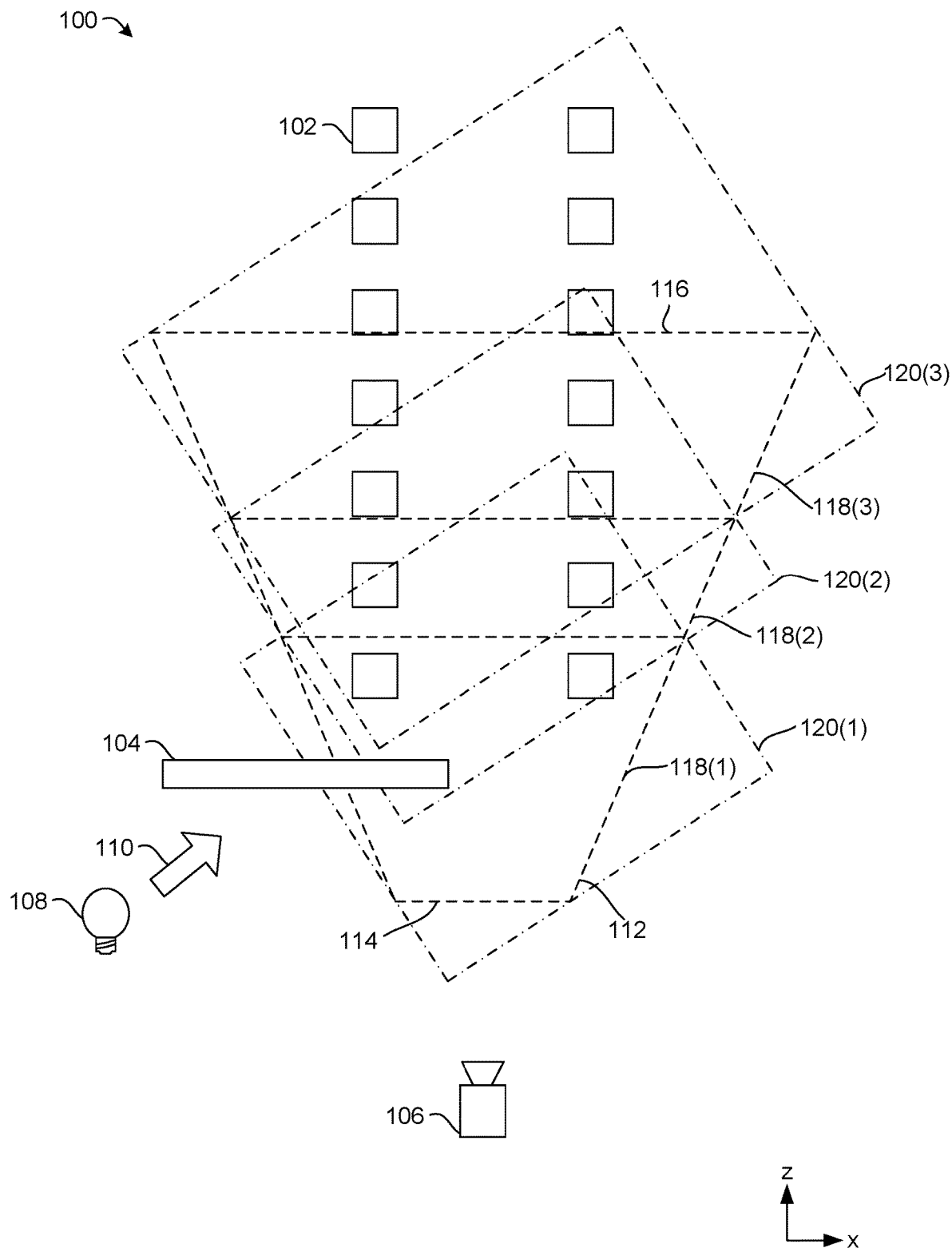
FIG. 1 shows a top view of an example world, consistent with the present concepts.

The present concepts relate to improved processing for rendering 3D computer graphics. These concepts include shadow culling techniques that save on processing of potentially unnecessary calculations for objects that may not contribute to the viewable scene.

Suppose a simple virtual world includes ground and a tree with sunlight. A conventional way to present the scene to a user on a display screen is to render the lighting using the base colors of the ground and the tree, which is called diffused lighting, without any shadows. That is, the colors of the objects (e.g., the ground and the tree) are rendered without shading or shadows. Then, to render shadows, determinations may be made for the logical points on the screen whether they are in shadow or not.

A conventional way to make these determinations is to render the depths of the objects in the scene from the sun's perspective into a depth texture. For instance, if the sun was at the very top of the world (i.e., at high noon), a view of the tree from the top would be visible from the sun's perspective. These depths in the depth texture indicate the closest points from the sun's perspective that are filled or occluded.

When rendering the scene of the world from the camera's perspective (i.e., the user's perspective from the display screen) using the texture memory, a point that is under the tree can be mapped from the view of the sun, and the distance from the point under the tree to the sun can be compared with the distance stored in the depth texture from the sun's perspective. If the distance stored in the depth texture is smaller than the distance of the point from the sun's perspective, then the point is in shadow. Since the depth texture stores the closest distances from the sun (i.e., the first point that the sunlight hits), the point that is farther away from the sun than the distance stored in the depth texture is in shadow.

Performing these conventional techniques for determining whether points are in shadow or not for an entire scene can be very slow. Moreover, the resulting shadow may be unsatisfactory, particularly due to projected aliasing, where the rendered shadows appear pixelated, boxy, jagged, or saw-toothed. Simply increasing the resolution of the shadows is often infeasible due to memory limitations and the processing-intensive nature of shadow rendering. For example, a massive scene like a big city can include numerous objects. Calculating the distance from the sun for all of those objects can overwhelm the graphics processing unit ("GPU").

Cascaded shadow maps ("CSM") is an approach that can help alleviate the aliasing problem by grouping the objects in the world into multiple cascades and providing higher resolutions of the depth texture near the viewer and lower resolutions far away. Thus, CSM can provide high-quality shadows for objects that are close to the viewer, where quality matters the most, and objects farther away can have lesser-quality shadows, where quality matters less and is less noticeable. CSM may involve rendering a first set of the objects in the first cascade that are closest to the camera to a depth texture. Then, a next set of objects in the next cascade that are farther away from the camera may be mapped to another depth texture. This process may be repeated for the objects in subsequent cascades that are even farther away from the camera.

The above-described process may be performed by a central processing unit ("CPU"). To render an object for the main view, the CPU may command the GPU to render the object a particular color from a particular point of view. Rendering the depths from the sun's perspective may be performed similarly. The CPU can command the GPU to render the object, and render another object, and so on. As such, for a very big scene with many objects, the CPU may command the GPU to render the diffused lighting and then render the depths for all the cascades. So, in the instance where there are four cascades, the CPU may command the GPU to render an object five times, which can add up to a lot of draw calls from the CPU to the GPU. These processes that have conventionally been performed by the CPU may be performed by the GPU, because, if the CPU sends the positions of objects to the GPU, then the GPU can determine which objects are visible from a particular point of view.

For shadow culling in CSM, the visibility test may be performed for each object and each cascade. These visibility tests have conventionally been performed on the CPU and independently for each cascade, and thus the results of the computations cannot be reused between passes through the multiple cascades. Moreover, because the computations have been performed on the CPU, the results may be sent from the CPU to the GPU, which is time-consuming and can be a bottleneck. Furthermore, the results tend to be very conservative (i.e., overinclusive) and can include many objects that will not contribute to any samples taken during shadow sampling passes.

GPU-based culling techniques exist but they are usually used for main scene culling. For example, the Hierarchical Z-Buffer ("HZB") culling technique uses the depth buffer to generate a depth mip map pyramid to efficiently cull objects that could be occluded. A multum in parvo map (or "mip map") can store progressively lower-resolution representations of the same image, which can be particularly useful in increasing speed and reducing aliasing when rendering objects at a steep angle or at a far distance. However, applying this technique for CSM would require storing and generating an HZB buffer for each cascade, which is prohibitive in terms of memory. In a GPU-based renderer, one of the main objectives is to reduce CPU usage for operations, such as visibility testing, frustum testing, etc. However, it can be challenging to do this for shadow casting objects with CSM.

Accordingly, consistent with present concepts, a hit map can overcome the drawbacks from other techniques by having the GPU perform the above-described processes and by storing one hit map for all cascades. Because the scene depth can be projected into shadow space, the resulting visible set of objects for each cascade can represent the minimal set that will actually result in shadow samples.

Consistent with the present concepts, a hit map can be created that indicates which parts of the screen will actually be tested for shadows. Using the hit map, the GPU can directedly determine for all the cascades at once whether an object will need to be rendered. Furthermore, because this information can stay on the graphics card, performance is very much improved. There can be less communication from the CPU to the GPU. In one implementation of the present concepts, the CPU may send a list of objects to the graphics card (which can be done once if the objects don't move), and then the GPU can perform processing to render those objects, where the processing may include generating and using a hit map.

There are at least two advantages to performing these processes on the GPU. First, the GPU may perform superior parallel processing compared to the CPU. For example, if a virtual world has a thousand trees, the CPU may determine if each of the trees is visible or not, one by one, whereas the graphics card can make these determinations in parallel, for example, in groups of 64 trees at once. Therefore, parallel processing by the GPU can be faster. Second, another advantage is that the information stays on the graphics card, which can have its own memory. Transfers of data from the CPU to the GPU are usually very time-consuming, because data can take a very long time to transfer and also it can take a long time to replicate data in memory to somewhere that will be easily accessible. Therefore, keeping the information on the graphics card helps with performance.

FIG. 1 shows a top view of an example world 100, consistent with the present concepts. In this example, the world 100 may be a virtual 3D computer graphics world containing virtual 3D objects, including two rows of cubes 102 and a wall 104. (Refer to FIG. 2 for a perspective view of the world 100.) The objects in the world 100 may also include a floor, on which the cubes 102 are resting and on which the wall 104 is standing. The floor is not drawn in FIG. 1 since this figure shows a top-down view.

FIG. 1 shows a camera 106, which indicates the position and the view direction of a user and/or a display screen. The camera 106 illustrates an example camera view (also called the main view) of the world 100 shown in FIG. 2. The camera 106 is not an object in the world 100 that would be displayed.

FIG. 1 also shows a light 108 (depicted by a light bulb symbol) and a light direction 110 (depicted by an arrow symbol). These are not objects in the world 100 that would be displayed. The light 108 can be any type of point light (also called spot light) that has a position in the world 100, or the light 108 can be a directional light that does not have a position in the world 100 but has a direction. For example, the light 108 can simulate sunlight by having a direction but no position. Furthermore, a point light that is positioned very far away can simulate or approximate a directional light. In this example, the world 100 will be rendered using a directional light in the direction indicated by the light direction 110.

Figure 2:
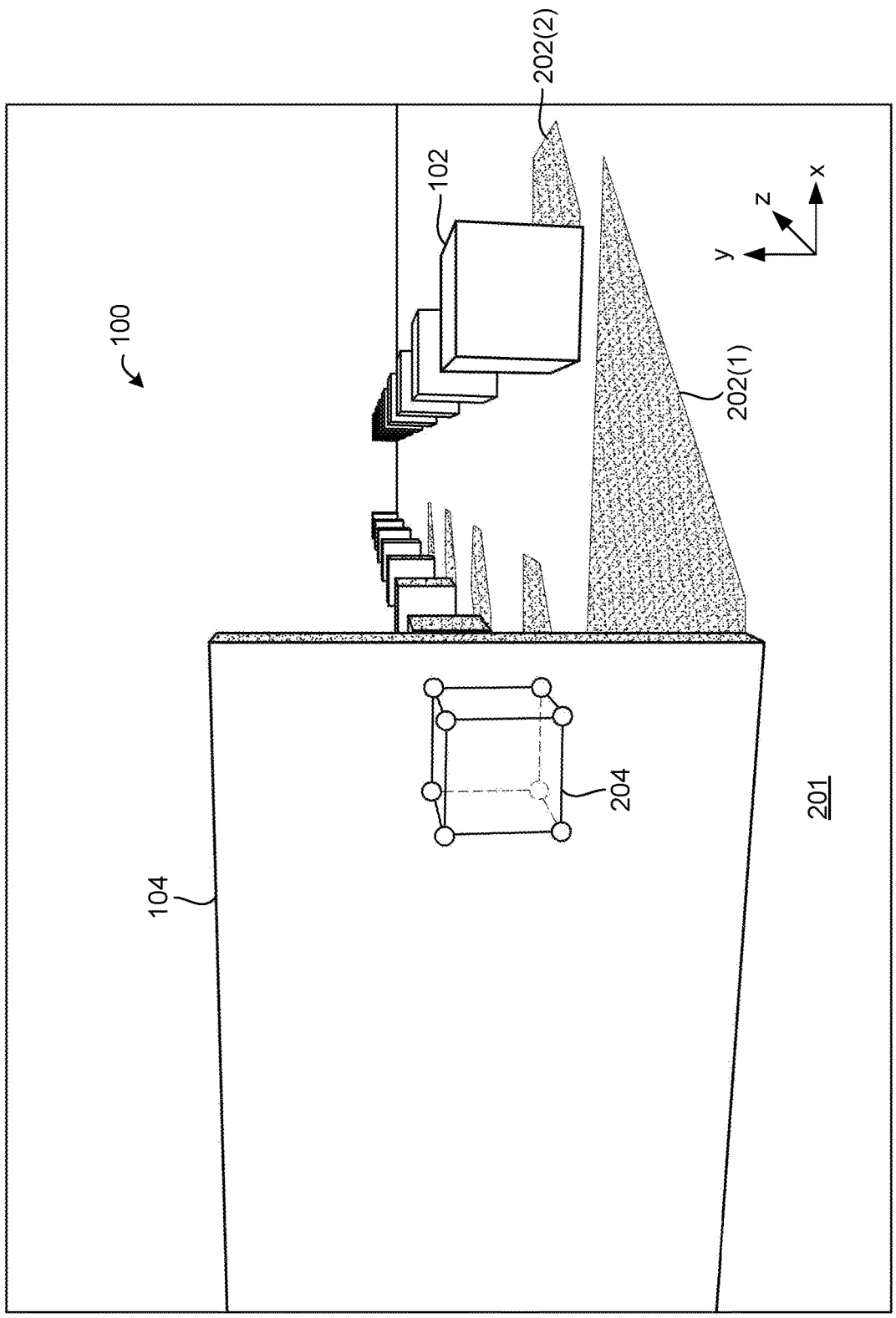
FIG. 2 shows a camera view of an example world, consistent with the present concepts.

FIG. 2 shows an example camera view of the world 100, consistent with the present concepts. The perspective view from the camera 106, as shown in FIG. 2, includes the floor 201, the wall 104 and the two rows of the cubes 102, parts of which are hidden from view behind the wall 104 and behind other cubes 102 that are closer to the camera 106. FIG. 2 also includes shadows 202, including a wall shadow 202(1) cast by the wall 104 and cube shadows 202(2) cast by the cubes 102. The shadows 202 are casted in the light direction 110. A frame cube 204 illustrates the position of one of the cubes 102 that is hidden behind the wall 104 and is not visible from the camera 106. The frame cube 204 will be explained in reference to FIG. 3.

FIG. 2 may represent a view of the world 100 that can be displayed on a display screen to a user. In one implementation of the present concepts, to render the world 100 for displaying, the CPU may send a list of the locations of all the objects (e.g., the cubes 102 and the wall 104) to the GPU and command the GPU to render the world 100 (or render all of the objects) with a particular point of view from the camera 106. Assuming that the GPU already has the 3D model shapes of the objects, the GPU now has the locations of all the objects and can therefore render those objects from the view of the camera 106 using the base colors of the objects. To do so, the GPU may determine which parts of the world 100 (which objects in the world 100) are visible from the point of view of the camera 106 and may also determine which parts of the world 100 are in shadow or not.

Referring back to FIG. 1, in one implementation, a view frustum 112 (also called a camera frustum) may be defined as a field of perspective view from the camera 106 that includes a region of the world 100 that may appear on the display screen. The view frustum 112 may include a near plane 114 and/or may include a far plane 116. Consistent with the present concepts, the view frustum 112 may be divided into two or more subfrusta 118 (also called cascades). In this example illustrated in FIG. 1, the view frustum 112 has been split into three subfrusta 118—a near subfrustum 118(1), a middle subfrustum 118(2), and a far subfrustum 118(3)—but other numbers of subfrusta 118 are also possible.

The number of subfrusta 118 and the distances along the z-axis that they cover (i.e., the locations of the splits) may be discretionary. There are many techniques for partitioning the view frustum 112 into multiple subfrusta 118. One technique for splitting the view frustum 112 may be to calculate intervals from 0% to 100% in the z-axis direction (the view direction of the camera 106). Each of those intervals can represent a near/far plane boundary between neighboring subfrusta 118. The splits can be set manually. Alternatively, an equation can be used to partition the view frustum 112. As another option, the locations of the splits can be dependent on the scene.

For example, where the near plane 114 is located at 1 unit and the far plane 116 is located at 1000 units (any unit can be used, such as pixels, meters, percentages, etc.), the near subfrustum 118(1) can cover 1-20 units, the middle subfrustum 118(2) can cover 20-80 units, and the far subfrustum 118(3) can cover 80-400 units. In this example, objects that are very far from the camera 106 (i.e., beyond 400 units) will not have any shadows, since such details would not be very noticeable to the user anyways. For example, in the perspective view shown in FIG. 2, only the first four pairs of the cubes 102 have shadows, whereas the smaller cubes that are farther away do not have any shadows. Therefore, the subfrusta 118 may not cover the entire range along the z-axis of the view frustum 112 from its near plane 114 to the far plane 116.

Because the shadow maps that will be generated for the subfrusta 118 may be of the same size and the subfrusta 118 tend to be smaller close to the camera 106 and larger far from the camera 106, the shadows in the near subfrustum 118(1) may have higher resolution and quality than the shadows in the far subfrustum 118 (3). Accordingly, shadows near the user may have higher resolution and quality than shadows that are far from the user. This technique provides improved allocation of computing resources, because objects that are far away tend to cast shadows that occupy small screen space, whereas objects that are close to the camera 106 tend to cast shadows that occupy larger screen space.

Figure 3:
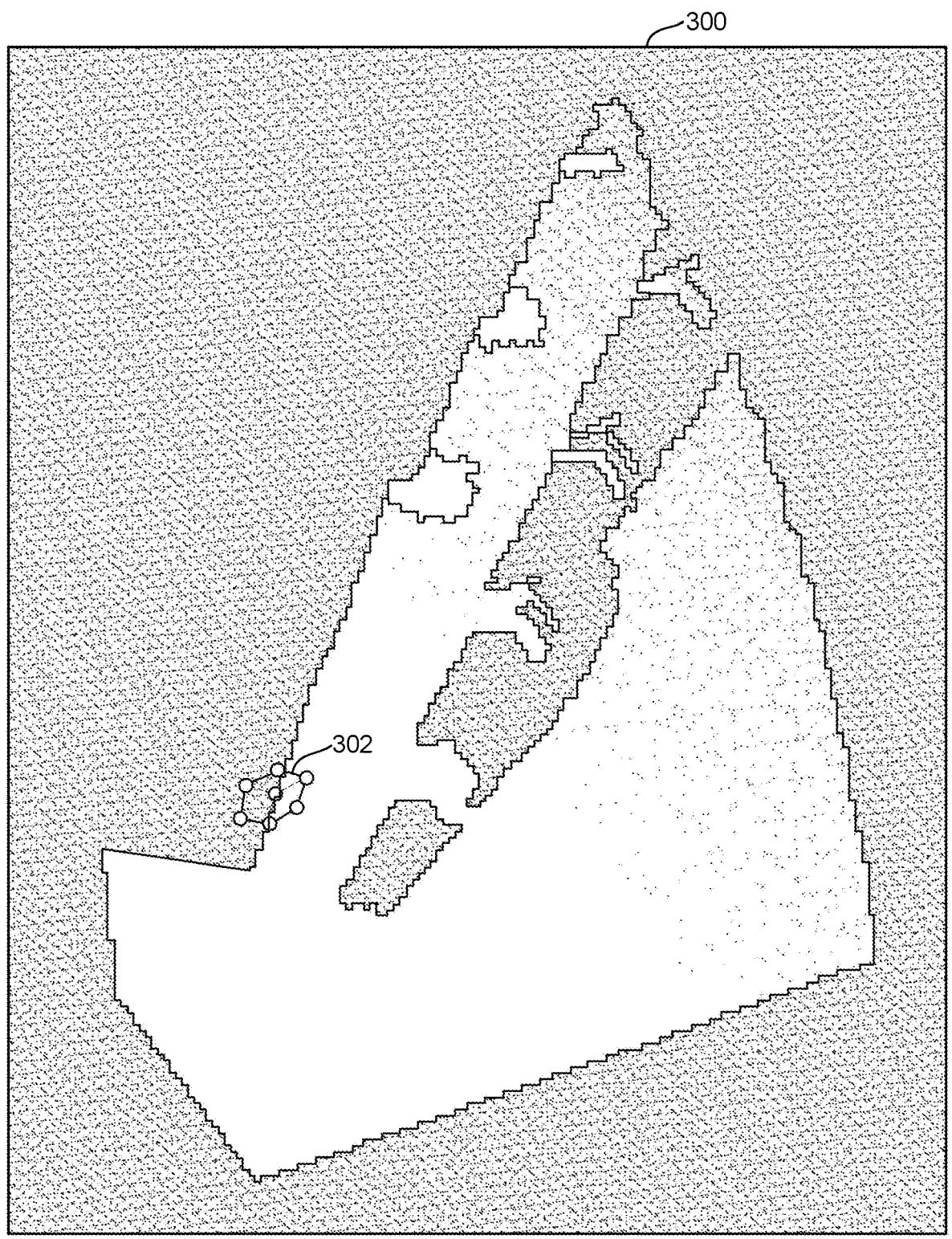
FIG. 3 shows an example hit map, consistent with the present concepts.

FIG. 3 shows an example hit map 300 generated for the world 100 shown in FIG. 1 and FIG. 2, consistent with the present concepts. A depth buffer may be generated by rendering the depth of the part of the world 100 in the view frustum 112 that is visible from the perspective of the camera. Accordingly, the depth buffer may store the distances (depth values) from the camera 106 of pixels that are visible from the view of the camera 106. The depth buffer may be stored as a texture image.

The depth buffer can be used to generate the hit map 300. The hit map 300 can be generated by projecting every pixel from the depth buffer of the main scene (the distances from the camera 106) into shadow map space by using the world-to-shadow matrix of each cascade. The world-to-shadow matrix may be already known by the GPU. The world-to-shadow matrix can transform a 3D world coordinates for the world 100 into a 2-dimensional ("2D") world coordinates for the hit map 300. The world-to-shadow matrix may be used to render the depths of the objects from the perspective of the camera 106. All the depths of the closest pixels in the scene that are visible from the camera 106 can be projected using the world-to-shadow matrix into 2D space for the hit map 300, which are represented by white pixels in the hit map 300 illustrated in FIG. 3.

In addition to storing the depth values, each pixel of the hit map 300 may also contain either a zero value (illustrated with a black pixel in FIG. 3) if no sample will be taken from it or a mask which indicates which of the cascades will sample the pixel. Accordingly, the hit map 300 can indicate not only whether each shadow map pixel will be sampled during the shadow sampling pass but also which cascades will sample the pixel.

The hit map 300 may be saved as a texture image in the memory of a graphics card. The example texture image of the hit map 300 in FIG. 3 shows only white pixels for illustration purposes, but the hit map 300 may include multiple colors corresponding to multiple cascades.

In one implementation, the hit map 300 can be generated once and it can cover all the multiple cascades. For example, a near cascade corresponding to the near subfrustum 118(1) can be assigned one color, a middle cascade corresponding to the middle subfrustum 118(2) can be assigned a different color, and a far cascade corresponding to the far subfrustum 118(3) can be assigned another color. Later, when the hit map 300 is used to generate shadow maps for each cascade, only the objects inside each cascade may be rendered. By generating the hit map 300 using different colors for the multiple cascades, the hit map 300 can be queried and the pixels corresponding to the position of an object can be sampled from the hit map 300 once to determine which cascade the object is part of.

Generating the hit map 300 may take only a fraction of the overall frame time. By generating the hit map 300 in a single pass at the start of the frame, the hit map 300 can be used subsequently for culling different sets of objects directly on the GPU. Furthermore, because the hit map 300 contains the results for all cascades at once, the hit map 300 can enable very efficient shadow culling on the GPU by sampling the hit map 300 after projecting the bounding box of each object into shadow map space.

Consistent with the present concepts, the hit map 300 in this example illustrated in FIG. 3 includes a lot of black pixels for corresponding parts of the world 100 that would not contribute to the scene rendered from the perspective of the camera 106, because parts of the world 100 are hidden behind the wall 104 and hidden behind the cubes 102 and thus invisible by the camera 106. Therefore, invisible objects (behind the wall 104 and/or the cubes 102) may not be tested for shadows. To do so would be a waste of processing resources. The white pixels in the hit map 300 correspond to parts of the world 100 that should be tested to determine if they are in shadow or not.

Consistent with the present concepts, the hit map 300 indicates whether a shadow test should be performed or not. The hit map 300 does not directly indicate if the pixel is actually in shadow or not. The shadow test itself may be performed later after determining, based on the hit map 300, that the shadow test should be performed.

To be able to determine if a point is in shadow or not, a shadow map can be rendered from the perspective of the light 108 for each of the cascades. In the example shown in FIG. 1, there are three cascades. The last cascade (i.e., the far subfrustum 118(3)) may not extend to the far plane 116 of the view frustum. For the GPU to be able to determine which objects are inside each cascade and thus should be rendered from the perspective of the light 108 onto a shadow map for the current cascade, the GPU may determine if a particular object is inside the current subfrustum 118 that corresponds to the current cascade.

Consistent with the present concepts, orthogonal projection cuboids 120 (also called light view projections) may be determined for the subfrusta 118. The orthogonal projection cuboid 120 may be defined as the smallest bounding box that encompasses the subfrustum 118 and is oriented along the light direction 110 (i.e., the edges of the orthogonal projection cuboid 120 are either parallel or perpendicular to the light direction 110).

In one implementation, the coordinates of the vertices of the subfrustum 118 may be used to calculate the orthogonal projection cuboid 120. In the example in FIG. 1, a near orthogonal projection cuboid 120(1), a middle orthogonal projection cuboid 120(2), and a far orthogonal projection cuboid 120(3) may be defined for the near subfrustum 118(1), the middle subfrustum 118(2), and the far subfrustum 118(3), respectively. These three orthogonal projection cuboids 120 can be used to render each subfrustum 118 into different shadow maps.

Consistent with the present concepts, a shadow map may be rendered for each subfrustum 118. In the example shown in FIG. 1, three shadow maps can be created for the three subfrusta 118 using the three orthogonal projection cuboids 120.

Conventionally, a snapshot of the part of the world 100 that is defined by the orthogonal projection cuboid 120 is taken by rendering the depths from the point of view of the light 108 (rather than from the point of view of the camera 106) to generate a shadow map. This conventional step can check which objects in the world 100 are inside the current cascade (or the current subfrustum 118) and can cull objects that are outside the current cascade. However, this conventional culling alone may be insufficient, because the set of objects in the current cascade may still include objects that may not actually cast any shadow onto the scene.

Therefore, consistent with the present concepts, an additional culling may be performed by checking the hit map 300 to determine if an object inside the cascade may actually cast a shadow onto the scene. For each object in the current cascade, the coordinates of a bounding box that encompasses the object are checked against the corresponding coordinates in the hit map 300 for the current cascade. If all the pixels in the hit map 300 for the object have zero value (represented by black pixels in FIG. 3), then this object can be excluded from the shadow map, thereby reducing processing resources of the GPU and speeding up the rendering processes. If any of the pixels in the hit map 300 for the object has a mask bit set for the current cascade (represented by a white pixel in FIG. 3), then this object can be included in the shadow map, so that the object can later be tested to determine whether any portion of it casts a shadow onto the scene or not. This culling process can be repeated for every cascade.

In one implementation, the hit map 300 may be referenced when rendering the shadow maps one cascade at a time. The hit map can contain a bit mask, for example, four bits for four cascades, one bit for each cascade. For instance, if bit #1 for cascade #1 is set for a particular pixel, then there would be a shadow test there. Therefore, a black pixel in the hit map 300 illustrated in FIG. 3 indicates that none of the cascade bits are set and thus a shadow test is unnecessary.

A white pixel in the hit map 300 illustrated in FIG. 3 indicates that at least one of the cascade bits is set and a shadow test should be performed in one or more cascades depending on which cascade bits are set. For example, if a pixel in the hit map 300 has the cascade bits #1, #2, and #3 set but not cascade bit #4, then the object in the position corresponding to that pixel is useful for cascades #1, #2, and #3, but not for cascade #4.

Therefore, the present concepts may provide for shadow culling. Culling, in general, is the process of determining if an object is going to be needed or not. One example of basic culling is frustum culling, which is unrelated to shadows, where each object is tested to determine whether it is inside the view frustum 112 or not. If the frustum culling is performed by the CPU, then objects that are not inside the view frustum 112 can be culled out and not sent by the CPU to the GPU for rendering.

The present concepts provide for shadow culling, which may be similar in principle to frustum culling but for shadows. An additional culling test can be performed using the hit map 300 for each cascade, such that fewer objects need to be rendered into the shadow maps by culling certain objects that are not going to be useful for shadow tests.

As an illustration, suppose there is a small cube completely hidden behind a large cube from the perspective of the camera 106. The coordinates of a bounding box around the small cube is transformed using the world-to-shadow matrix into coordinates in the hit map 300. If the coordinates in the hit map 300 cover any white pixels, then the small cube (or at least a portion of it) may cast a shadow onto the scene and thus the small cube should be rendered to the shadow map. Accordingly, a shadow test can be performed for the small cube later.

Therefore, the shadow map may store the depths (i.e., the closest distances from the light 108) of the scene from the perspective of the light 108. The shadow map, which stores the depth values, can be called a depth map. In one implementation, a combined view and projection matrix may be used as a shadow transform to render the model of the world 100 into the shadow map. This process may be repeated for each orthogonal projection cuboid 120 to generate multiple shadow maps, one for each subfrustum 118 or cascade.

In one implementation, each shadow map may be stored as a texture image. Accordingly, the shadow map can also be called a shadow texture or a depth texture. Each shadow map can have the same size (e.g., 1024×1024, 2048×2048, or 4096×4096). Therefore, the shadow map for the near subfrustum 118(1) may have higher resolution than the shadow map for the far subfrustum 118(3), because the near subfrustum 118(1) tends to be smaller size than the far subfrustum 118(3). A null pixel shader may be used to generate the shadow maps, because only the depths are needed and pixel colors are unnecessary. The shadow maps may cover the portion of the world 100 that is visible from the perspective of the camera 106, because the orthogonal projection cuboids 120 encompass the subfrusta 118, which make up the view frustum 112.

Consistent with the present concepts, by using the hit map 300 to check and additionally cull objects that would not contribute to the scene, the GPU can more efficiently and quickly generate the shadow maps. As described above, the hit map 300 can be used to determine which objects will potentially contribute any shadow to the scene and therefore be used to cull objects that have no potential to contribute any shadow to the scene. All the objects that pass this culling test based on the hit map 300 can be used to render the shadow maps from the perspective of the light 108 for all the cascades. Then, the shadow maps for the cascades can be used to determine if a pixel from the main view is in shadow or not.

When the light direction 110 is different from the direction of the camera 106, objects that are hidden from the view of the camera 106 may not be hidden from the perspective of the light 108 and thus still cast a shadow (e.g., sideways) that is visible by the camera 106. Such objects may be rendered by the GPU so that their shadows can be rendered into the scene.

The culling of the objects when generating the shadow maps may take into account such shadows that are visible from the camera 106 but are cast by objects that are hidden from the camera 106. Because the depth space from the scene is mapped into the shadow space, if objects hidden from the view of the camera could cast a shadow that is visible from the camera 106, then the hit map 300 may have white pixels for that object, causing a shadow test at that location. This accounts for the white pixels inside the black regions in the hit map 300 that represent the areas behind the wall 104 and behind the cubes 102 that are hidden from the view of the camera 106.

For example, the frame cube 204 in FIG. 2 may be hidden behind the wall 104 from the view of the camera 106. Nevertheless, when the world coordinates of the frame cube 204 in FIG. 2 are projected as a projected frame cube 302 into the hit map 300 in FIG. 3, the projected frame cube 302 may overlap with white pixels in the hit map 300. Therefore, the frame cube 204 (although hidden from the camera 106) might cast a shadow on the scene (shown in FIG. 2) that is visible from the camera 106. Accordingly, the frame cube 204 passes the culling test and is therefore rendered into the shadow map, which will then be used later for the actual shadow test. As mentioned above, the white pixels in the hit map 300, although just a white color in FIG. 3, can contain data about which cascade(s) will query that pixel, so that it can quickly be determined whether the frame cube 204 is part of a specific cascade.

After the shadow maps have been generated for all of the cascades, the world 100 may be displayed to the user from the perspective of the camera 106 (as shown in FIG. 2) by rendering the scene. Furthermore, the three shadow maps can be used to determine which pixels in the scene are in shadow or not.

In one implementation, for each pixel, the depth of the pixel from the perspective of the camera 106 may be checked against the depth ranges of the three shadow maps to determine which shadow map the pixel falls in. Because there are multiple shadow maps for the multiple cascades, the appropriate shadow map may be selected to determine whether the pixel is in shadow or not. Then, the depth of the pixel from the perspective of the light 108 can be compared with the depth value stored in the shadow map at the coordinates corresponding to the pixel position. If the depth of the pixel from the perspective of the light 108 is greater than the depth value stored in the shadow map, then the pixel is in shadow (either because the pixel is occluded by another object that is closer to the light 108 or because the pixel is facing away from the light 108) and the color of the pixel can be darkened.

Because the shadow maps contain the distances to the closest pixels from the sun's perspective, the shadow maps can be used to test whether a pixel is in the shadow or not. For example, a pixel on the floor 201 can be tested to determine whether the pixel is in shadow or not. The coordinates of the pixel can be transformed from the world space to shadow space to obtain a coordinate in the shadow map. If the distance from the pixel to the light 108 is larger than the depth value stored in the shadow map at the coordinates, then an object is blocking the light 108 from the pixel, which is in shadow. Accordingly, the color of the floor 201 at the pixel position can be darkened to show that it is in shadow.

As explained above, the shadow maps are used to perform shadow tests. As such, the shadow maps should contain all the objects that could potentially cast a shadow onto the scene. But the shadow maps need not wastefully contain objects for which shadow tests are not needed.

In one implementation, for each pixel in the scene, the appropriate shadow map can be referenced to determine whether the pixel is in shadow or not. First, the appropriate shadow map for that pixel may be determined. There are many ways to perform this determination. For example, the appropriate shadow map may be determined based on the distance from the pixel to the camera 106. Alternatively, the appropriate shadow map may be determined based on the texture coordinates that correspond to the pixel coordinates.

Then, the distance from the pixel to the light 108 is compared with the depth stored in the shadow map under the calculated coordinates. This comparison determines whether the pixel is in shadow or not. If the distance from the pixel to the light 108 is higher than the depth value sampled from the shadow map, then the pixel is in shadow and there is an occluding object that is closer to the light 108 than the pixel. If the pixel is in shadow, the pixel color (or diffuse value) can be darkened.

Figure 4:
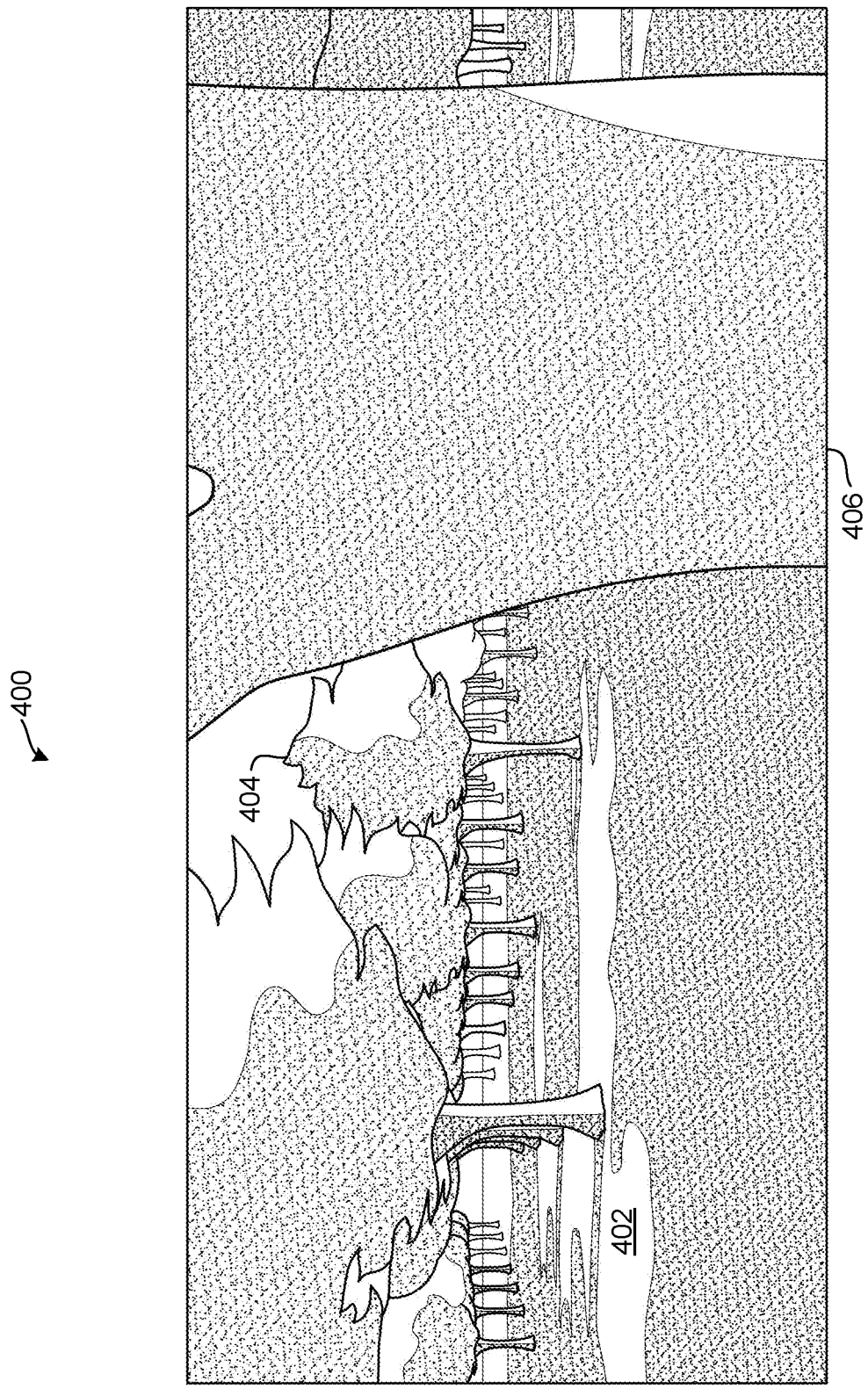
FIG. 4 shows a camera view of an example world, consistent with the present concepts.
Figure 5:
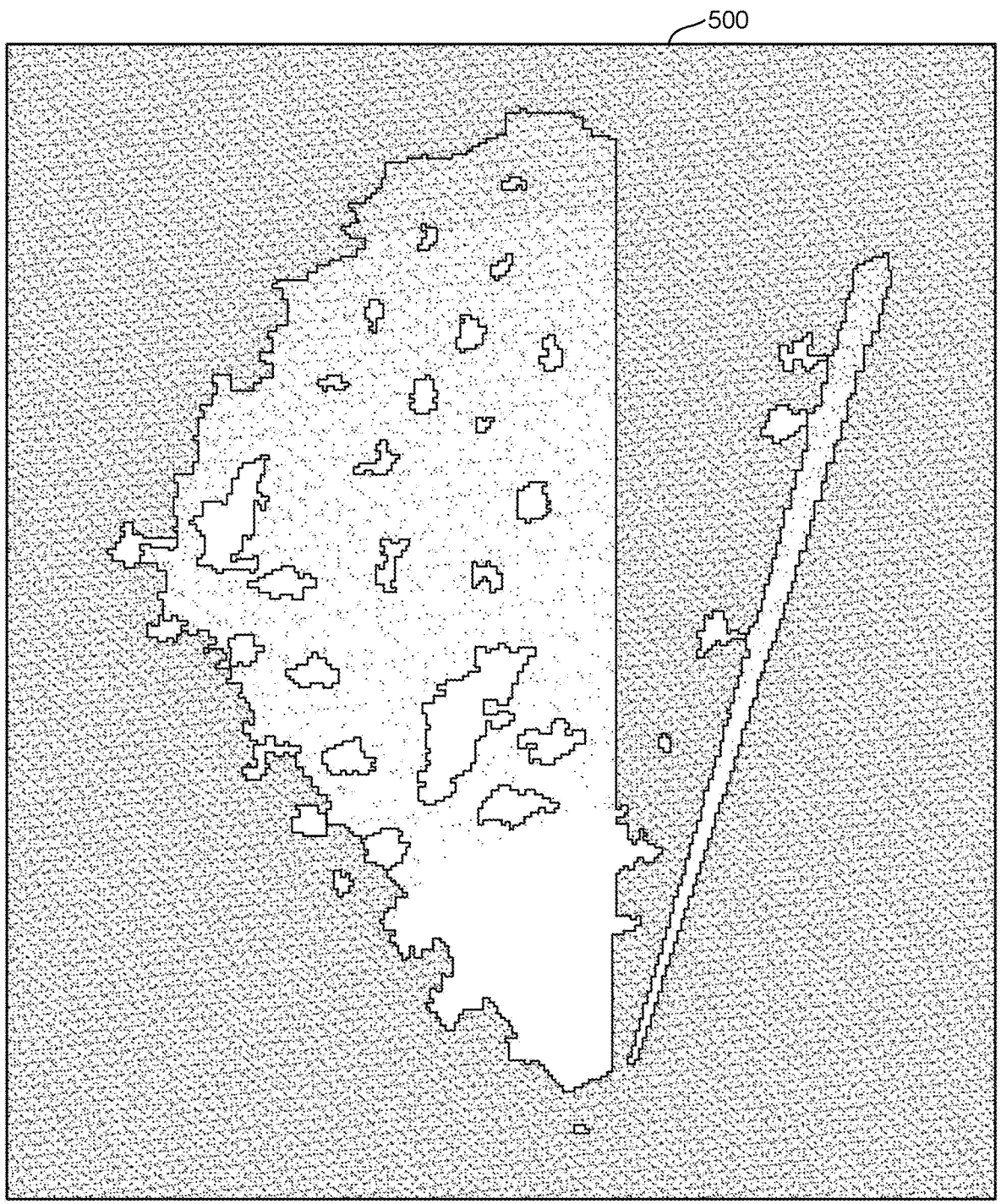
FIG. 5 shows an example hit map, consistent with the present concepts.

The present concepts will be further illustrated using another 3D virtual world example in reference to FIGS. 4 and 5. FIG. 4 shows a camera view of another example world 400, consistent with the present concepts. In this example, the world 400 may be a virtual forest that includes ground 402 and trees 404. The depiction of the world 400 shown in FIG. 4 may be a perspective view that can be rendered on a display screen to a user. The light in the scene may be simulated by sunlight from top right. FIG. 4 may include a big trunk 406 of a tree, not necessarily because this tree is actually bigger than the other trees 404 but rather the big trunk 406 appears larger because it is positioned closer to the camera. Therefore, the forest includes many trees 404 that are hidden behind the big trunk 406 and thus invisible in the perspective view from the camera.

A camera view frustum may be defined based on the position and direction of the camera. The camera view frustum may define which part of world 400 may be visible from the perspective view of the camera. Then, a number of cascades may be selected. And, the camera view frustum may be split into multiple subfrusta based on the selected number of cascades. The subfrusta can extend the entire z-directional range of the camera view frustum. Alternatively, the far plane of farthest subfrustum may be closer to the camera than the far plane of the camera view frustum, such that objects in the world 400 that are beyond the far plane of the farthest subfrustum may not have any shadows. Such lack of detail should not be very noticeable to a user.

Consistent with the present concepts, a hit map may be created by rendering the scene from the perspective of the camera, taking the depth buffer of the scene and storing the distances of each pixel from the camera. That is, the 3D world positions of all the pixels that are visible from the camera may be transformed using the world-to-shadow matrix into 2D positions in the hit map. The depth buffer from the scene (the distance from the camera to every pixel) can be transformed into the hit map.

FIG. 5 shows an example hit map 500 that may be generated using the world 400, consistent with the present concepts. The white pixels in the hit map 500 may be the 3D positions of objects in the world 400 that have been transformed into 2D positions in in the hit map 500. Therefore, the white pixels in the hit map 500 show where in the world 400 shadow tests should be performed. The white pixels in the hit map 500 may fan out in a cone (or pyramid) shape, similar to the shape of the camera view frustum, because the hit map 500 is generated from the perspective of the camera, where the position of the camera is near the bottom center of the hit map 500. Furthermore, the hit map 500 may include a lot of white pixels near the bottom, because there are shadows close to the camera near the bottom of the main view in FIG. 4.

Therefore, the black pixels in the hit map 500 may represent parts of the world 400 for which shadow tests will not be performed, because those parts may not contribute anything to the main scene in FIG. 4. These black pixels in the hit map 500 allow for saving on processing resources.

Because the big trunk 406 is hiding some of the trees 404 and a part of the ground 402 that are behind the big trunk 406, the hit map 500 may include a wedge-shaped region of mostly black pixels inside the pyramid-shaped region of mostly white pixels. In the camera view shown in FIG. 4, any object behind the big trunk 406 may not be shadow tested to determine if it is in shadow or not. Thus, such an object may not be rendered by the GPU to the shadow maps. Accordingly, such an object would be part of the wedge of black pixels in the hit map 500. Therefore, consistent with the present concepts, the hit map 500 may allow culling of objects (parts of the world 400) that will not contribute to the scene. For example, the ground behind the big trunk may not need shadow tests, because those ground pixels will not appear on the main scene.

Generating the hit map 500 before generating shadow maps can allow many objects that will not contribute anything to the main scene (e.g., the trees 404 hidden behind the big trunk 406) to be omitted from the shadow maps. These objects can be omitted from the shadow maps, because the pixels behind the big trunk 406 need not be shadow tested to determine if they are in shadow or not. Therefore, the shadow maps will have nothing in the coordinates that correspond to the wedge of black pixels in the hit map 500.

However, the black wedge in the hit map 500 may include some white pixels. Even though the big trunk 406 may be blocking the objects behind it from the view of the camera, some of those hidden objects can still cast shadows onto the main scene that are visible from the camera. Therefore, those pixels are white and shadow tests may be performed.

Consistent with the present concepts, a shadow test (determining whether a pixel is in shadow or not) is a different test from the hit map test (culling objects for which a shadow test may not be performed). The hit map 500 may determine whether a shadow test should be performed, but the actual shadow test itself of determining whether a pixel is in shadow or not may be performed later.

Consistent with the present concepts, a shadow map may be rendered for each cascade from the perspective of the sun. In one implementation, multiple orthogonal projection bounding boxes that encompass the respective subfrusta may be used to determine which objects in the world 400 are part of the current cascade when generating a shadow map for each cascade at a time.

Once the set of objects that are part of the current cascade is determined, rather than projecting all of those objects into a shadow map, consistent with the present concepts, the hit map 500 may be checked to determine if those objects will potentially contribute any shadow to the scene or not. This additional shadow culling of objects that will not contribute anything to the scene saves on GPU processing.

For example, to determine whether a tree 404 behind the big trunk 406 should be included or excluded from the shadow map, the 3D coordinates of all eight vertices of a bounding box for that tree 404 can be transformed using the world-to-shadow matrix into shadow space coordinates. This transformation results in eight 2D coordinates. These eight 2D coordinates can be checked on the hit map 500. If all eight 2D coordinates in the hit map 500 have black pixels, then the tree 404 will not contribute to the main scene and can be excluded from the shadow map. If any of the eight 2D coordinates in the hit map 500 has a white pixel, then the bounding box of the tree 404 projected from the sun's direction is visible from the main view and the tree 404 may be included in the shadow map. At this stage, it has been determined that some part of the bounding box may cast a visible shadow, but determining which part of the tree 404 (e.g., leaves, branches, trunk, etc.) actually casts a visible shadow will come later.

If an object is determined, based on the hit map 500, as needing a shadow test, then the object can be used to render the shadow map (or a depth buffer) from the sun's perspective for the current cascade. This process can be repeated for each cascade to generate multiple shadow maps for the multiple cascades.

In this example, because the big trunk 406 is hiding a lot of objects behind it, the hit map 500 includes a lot of black pixels in the shape of a wedge. Accordingly, the part of the world 400 that is behind the big trunk 406 may not require shadow tests. Therefore, the GPU may not test if all the objects behind the big trunk 406 actually will be in shadow or not. The GPU can skip shadow tests for all those black pixels because they won't result in shadows on the scene. Because that determination can be made using the hit map 500, the GPU processing requirement is reduced by not having to render those objects. Even though those objects behind the big trunk 406 that are visible from the sun's perspective would conventionally be rendered in shadow maps, consistent with the present concepts, the GPU will skip rendering those objects into the shadow map, because those pixels in the shadow map would not be queried later when the main scene is rendered.

After generating the shadow maps, the main scene of the world 400 can be rendered on the display screen. The shadow maps may be used to determine whether the pixels in the main view are in shadow or not. For each pixel being rendered, the corresponding shadow map is selected, the associated coordinates in the shadow map are sampled to compare the depth value stored in the shadow map and the distance from the pixel to the sun, and based on the comparison, the pixel can be determined to be in shadow or not.

Consistent with the present concepts, the hit map 500 allows additional culling of objects, which can save processing requirements. If the big trunk 406 were removed from the world 400 such that many trees and the ground behind the big trunk 406 are now visible, then the wedge of black pixels in the hit map 500 would be replaced with white pixels, which will require more shadow tests.

Using the hit map 500, consistent with the present concepts, a large portion of the ground 402 and many trees 404 that are hidden behind the big trunk 406 may not be included in the shadow maps and may not be shadow tested. The present concepts therefore provide for shadow culling and optimizing limited GPU resources. Saving the GPU from spending processing resources is an advantage. Here, creating the hit map 500 can be performed quickly, and the hit map 500 allows GPU to skip performing processing on objects that would not contribute anything visible on the scene.

Figure 6:
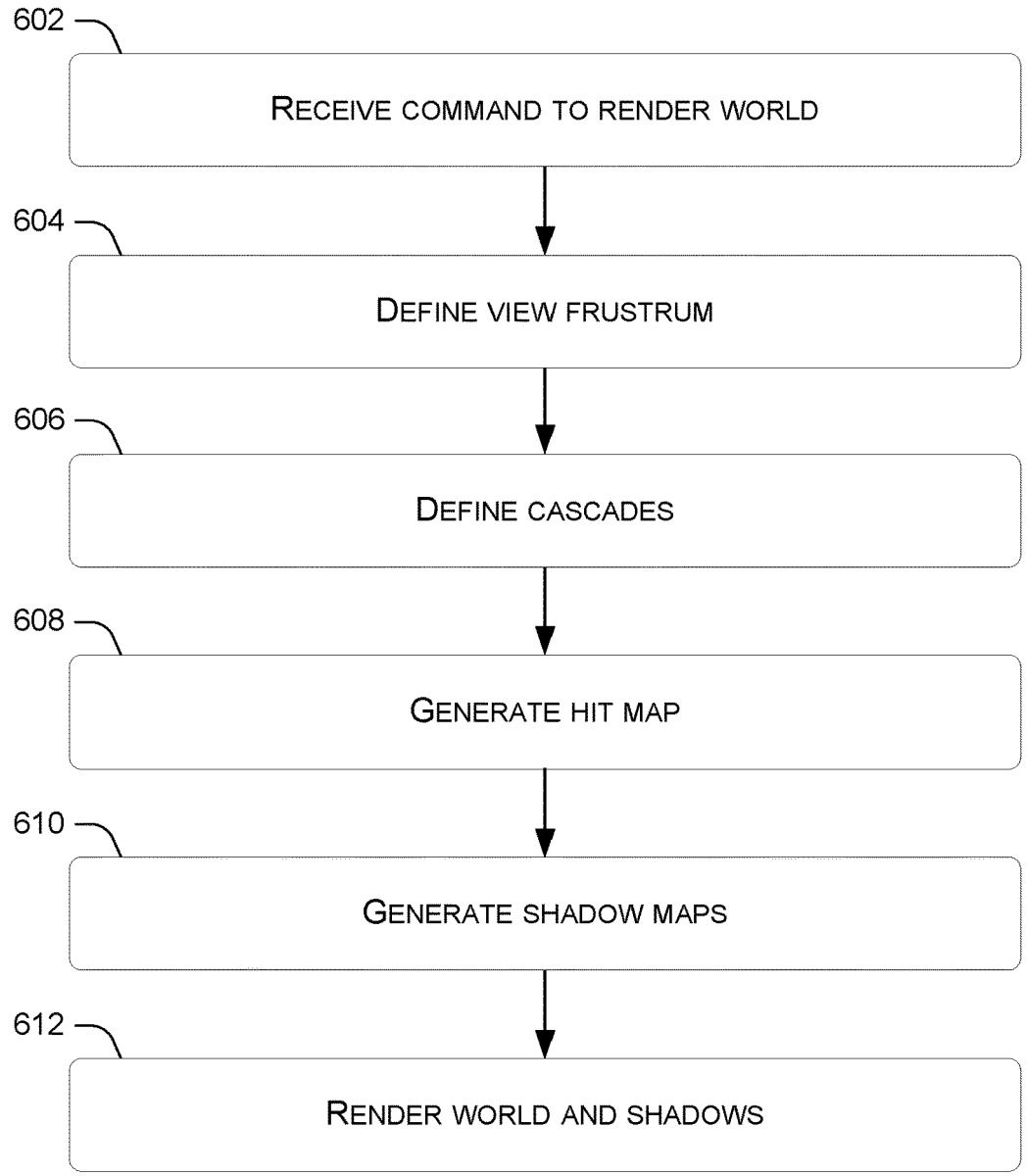
FIG. 6 shows a flowchart illustrating an example shadow culling method, consistent with the present concepts.

FIG. 6 shows a flowchart illustrating an example shadow culling method 600, consistent with the present concepts. The shadow culling method 600 may be performed to display a virtual 3D computer graphics world, such as the world 100 and the world 400, to a user via a display screen.

In act 602, a command to render a world for display may be received. The command may include and/or be accompanies by any combination of a set of objects in the world, the 3D shape models of the objects, the locations of the objects, a location and direction of a camera from which a perspective view of the world should be rendered, and a location and/or direction of a light source.

In act 604, a view frustum may be defined from the perspective of the camera. The view frustum may emanate from the camera in the direction of the camera, and define the perspective view of the camera. As such, objects inside the view frustum may be rendered to be visible to the user, whereas objects outside the view frustum may not be rendered as they are invisible to the user.

In act 606, a plurality of cascades may be defined, consistent with the present concepts. For example, in one implementation, three cascades may be defined, starting from a z-axis distance that is close to the camera, and progressively juxtaposed farther away from the camera in the z-direction. Alternatively, other numbers of cascades (e.g., two, four, five, six, and so on) may be defined.

In some implementations, the cascades may split the entire view frustum. In other implementations, the farthest cascade may end closer to the camera than the far plane of the view frustum. In one implementation, the cascades may be defined by splitting the view frustum (or a portion thereof) into multiple subfrusta. The locations of the boundaries between the subfrusta may be selected in many different ways.

In act 608, a hit map may be generated for all the cascades. Consistent with the present concepts, one hit map may be generated by rendering a depth buffer of the scene from the camera's perspective (i.e., the distances from the pixels in the world to the camera). For each point in the world that was transformed into a pixel in the hit map, the hit map can store for that pixel a mask with a cascade bit set to 1 for the cascade(s) associated with the point.

In act 610, shadow maps may be generated for the cascades using the hit map. First, for each cascade, a set of objects in the current cascade may be determined, thus culling and removing all other objects. In one implementation, an orthogonal projection cuboid that tightly fits the subfrustum associated with the current cascade may be used to determine which objects are inside and which objects are outside the current cascade.

Second, the hit map can be checked to determine whether the objects in the current cascade may need shadow tests. In one implementation, for each object that is in the current cascade, the 3D world space coordinates of a bounding box around the object can be transformed using a world-to-shadow matrix into a 2D shadow map space coordinates. Then, the pixels in the hit map at the calculated 2D coordinates may be checked to determine whether the cascade bit for the current cascade is set. If any of the pixels are set, then the object may be included in the shadow map. If none of the pixels are set, then the object can be excluded from the shadow map, because the object will not contribute or cast a shadow onto the scene. Culling and excluding objects from the shadow map can avoid unnecessary processing to render an object that will not contribute anything to the scene.

In act 612, the world including shadows may be rendered using the shadow maps from the camera's perspective for display. In one implementation, when rendering the scene of the world from the camera's point of view, for each pixel, its z-value (distance from the pixel to the camera) may be referenced to determine which shadow map to look up. To determine whether the pixel is in shadow or not, the depth of the pixel from the sun's perspective may be compared with the depth value stored in the shadow map at a position that corresponds to the position of the pixel. If the depth of the pixel is larger than the depth value stored in the shadow map, then the pixel is in shadow.

Although various processes, including the shadow culling method 600, have been shown and described as being a series of acts, the processes are not limited to the specific example orders of the sequence. For example, some acts can occur in different orders than what has been described herein. In addition, some acts can occur concurrently with other acts. Further, in some instances, not all acts may be required to implement a method described herein.

Figure 7:
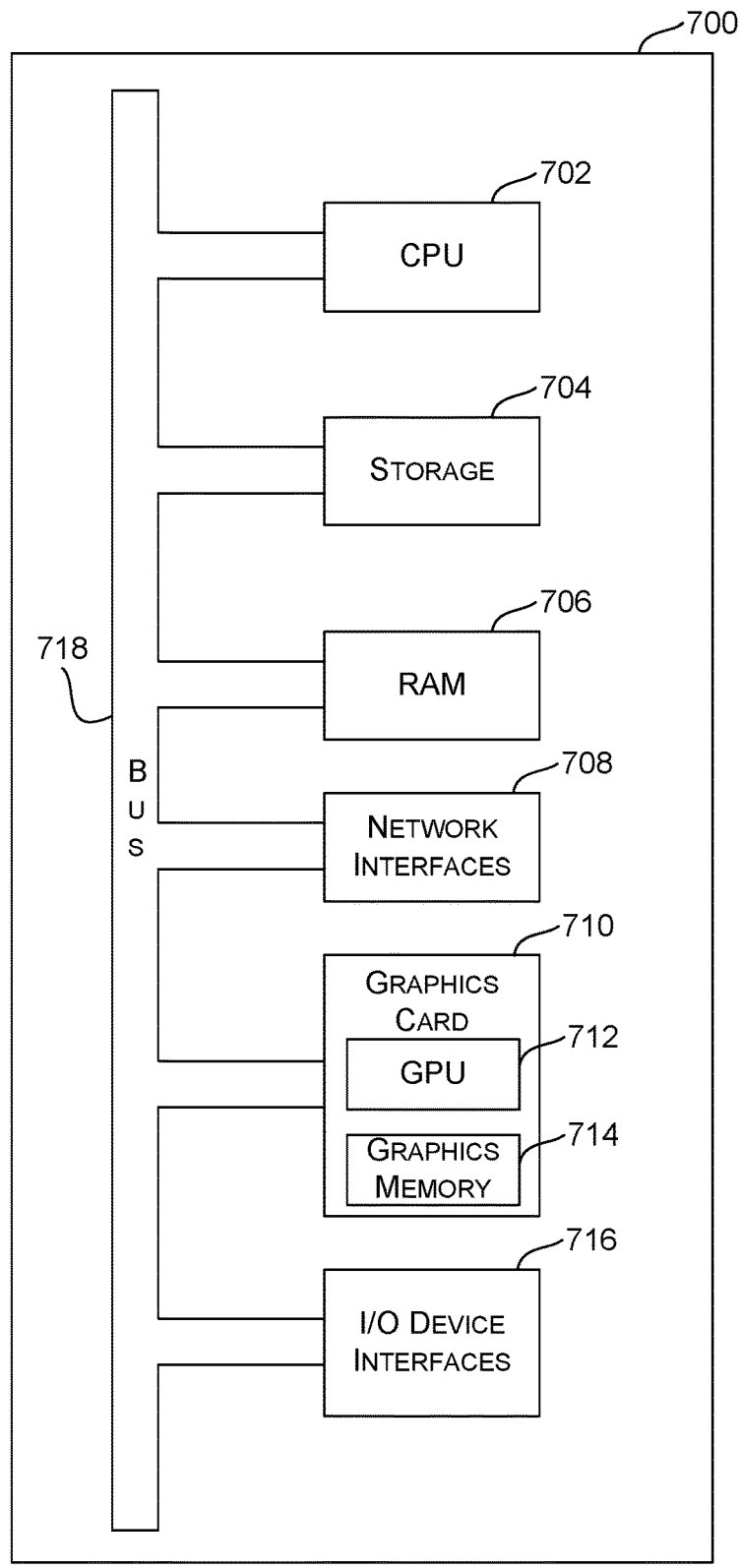
FIG. 7 shows a block diagram of an example computer, consistent with the present concepts.

FIG. 7 shows a block diagram of an example computer 700, consistent with the present concepts. The computer 700 may execute all or a part of the shadow culling method 600. The computer 700 may be any system that includes processing capability and storage capability to be able to execute instructions, for example, a server, mainframe computer, workstation, desktop personal computer ("PC"), laptop, notebook, tablet, smartphone, video game console, appliance, kiosk, automobile navigation or entertainment system, virtual reality simulator, minicomputer, hand-held device, programmable electronics, etc. Although only one computer 700 is illustrated in FIG. 7, the computer 700 may include several computers, for example, in a data center or connected via a network and/or provided by a cloud computing service.

The computer 700 may include a CPU 702 for executing instructions, for example, machine-executable instruction that implement various aspects of the present concepts described herein. Although only one CPU 702 is shown in FIG. 7 for simplicity, the computer 700 may include multiple CPUs 702. The CPU 702 may be a single processor, a multi-processor, single-core units, and/or multi-core units. The CPU 702 may perform processing to implement the present concepts, including all or part of the shadow culling method 600.

The computer 700 may include storage 704 for storing data, including programs, applications, operating systems, and other machine-executable instructions. The storage 704 may include computer readable storage media, such as magnetic disks, optical disks, solid state drives, removable memory, external memory, and/or flash memory, etc. Computer readable storage media can be any available media for storing information without employing propagated signals. The storage 704 may store instructions and/or data (e.g., the objects in the worlds) for implementing the present concepts.

The computer 700 may include random access memory (RAM) 706 for loading active data, programs, applications, operating systems, and/or other machine executable instructions from the storage 704. The RAM 706 may be volatile and/or non-volatile memory. The RAM 706 may be used by the CPU 702 to load, access, and manipulate instructions and/or data for implementing the present concepts.

The computer 700 may include network interfaces 708 to interfacing with one or more networks to communicate with other computers or devices (e.g., networked storage, networked display, etc.). The network interfaces 708 can include wired network interfaces for connecting to wired networks (e.g., ethernet), and can also include wireless network interfaces for connecting to wireless networks (e.g., Wi-Fi, Bluetooth, cellular, etc.). In some implementations, the computer 700 may communicate with other computers using the network interfaces 708 to implement all or part of the present concepts in a distributed manner.

The computer 700 may include a graphics card 710 for displaying graphics on a display screen. The graphics card may be connected to an on-board display or an external display, and may include an interface to sending video signals to the display. The graphics card 710 may include a GPU 712 for executing instructions related to graphics. The graphics card 710 may also include graphics memory 714 for storing instructions and/or data related to graphics.

Although FIG. 7 illustrates only one GPU 712, the graphics card 710 may include multiple GPUs. The GPU 712 may be a single processor, a multi-processor, single-core units, and/or multi-core units. The graphics card 710, including the GPU 712 and the graphics memory 714, may implement the present concepts, including all or a part of the shadow culling method 600. For example, the graphics memory 714 may store a hit map, consistent with the present concepts. The GPU 712 and the CPU 702 may communicate with each other and work together to implement the present concepts.

The computer 700 may include input/output ("I/O") device interfaces 716 for interfacing with one or more I/O devices, such as a keyboard, mouse, track pad, speaker, microphone, printer, scanner, facsimile machine, camera, infrared remote control, joystick, game pad, stylus, touch screen, etc. A user may provide input to the computer 700 using one or more of these input devices and receive output from the computer 700 using one or more of these output devices.

The computer 700 may include a bus 718 that connects various components of the computer 700 and provides an interface for those components to communicate and transfer data among one another. The bus 718 may also connect to other buses inside the components, such as a memory bus inside the RAM 706, and/or connect to external peripheral buses for interfacing with external peripherals, such as peripheral component interconnect ("PCI") components. For example, the I/O device interfaces 716 may include a parallel port, a serial port, a game port, a universal serial bus ("USB") port, etc.

The computer 700 illustrated in FIG. 7 is merely one example. Many other configurations of the computer 700 are possible. The number and the types of components in the computer 700 can vary. Multiple computers can be used together.

In one example implementation of the present concepts, the techniques described above, including the shadow culling method 600, may be implemented by code using Compute Shaders on DirectX, which is an application programming interface ("API") that can be used to render 3D graphics. In this example, the code may be written in the high level shading language ("HLSL"). Compute Shaders can be used to run code on the GPU that is not just graphical code. Accordingly, the code written in Compute Shaders can run on a video game console or a PC. Alternatively, the present concepts may be implemented by code using Compute Shaders for OpenGL, an alternative API to DirectX.

As an example, a game developer or a game engine developer may program the shadow culling techniques, consistent with the present concepts, in HLSL code to use the DirectX API. A graphics card manufacturer may provide a graphics driver that supports the DirectX API. Accordingly, the HLSL can be transformed into language that the GPU understands and can be run by the GPU. Therefore, shadow culling can be performed inside the GPU.

The present concepts are not limited to the specific implementations described herein. For example, visibility testing and frustum testing can be performed by the CPU, or alternatively performed by the GPU. The other acts described herein can be executed by the CPU or the GPU. In general, it may be advantageous to perform certain tasks using the GPU that can perform parallel processing rather than using the CPU.

Various examples are described above. Additional examples are described below. One example includes a computer readable storage medium storing instructions which, when executed by a processor, cause the processor to: receive a command to display a set of objects, generate a hit map that indicates a first subset of the objects for which shadow tests will be performed, generate a plurality of shadow maps for a plurality of cascades, the shadow maps excluding a second subset of the objects based on the hit map, and render the set of objects and shadows from a camera view based on the shadow maps.

Another example can include any of the above and/or below examples where generating the hit map comprises rendering a depth buffer of the set of objects from the camera view.

Another example can include any of the above and/or below examples where generating the hit map further comprises projecting pixels in the depth buffer into a shadow map space using a world-to-shadow matrix.

Another example can include any of the above and/or below examples where the hit map includes pixels and stores a mask including cascade bits for each pixel.

Another example can include any of the above and/or below examples where generating the shadow maps comprises culling the set of objects based on the hit map to determine which of the set of objects to include in or exclude from the shadow maps.

Another example can include any of the above and/or below examples where culling the set of objects comprises projecting bounding boxes surrounding the set of objects into a shadow map spaces and sampling the hit map at vertices of the projected bounding boxes.

Another example can include any of the above and/or below examples where culling the set of objects comprises including the first subset of the objects in the shadow maps in response to sampling the hit map.

Another example can include any of the above and/or below examples where culling the set of objects comprises excluding the second subset of the objects from the shadow maps in response to sampling the hit map.

Another example includes a system comprising a processor and storage storing instructions which, when executed by the processor, cause the processor to: receive locations of a set of objects, generate a hit map including pixels and indications of whether shadow tests will be performed for the pixels, generate shadow maps by rendering the set of objects from a light perspective, the shadow maps excluding a subset of the objects that will not have shadow tests performed based on the hit map, and render the set of objects from a camera perspective, the shadow maps being used to determine which pixels of the set of objects are in shadow.

Another example can include any of the above and/or below examples where the indications in the hit map are masks including cascade bits for each pixel in the hit map.

Another example can include any of the above and/or below examples where the cascade bits determine whether to include or exclude the set of objects from the shadow maps.

Another example includes a method comprising receiving a set of objects, defining a plurality of cascades, and generating a hit map by rendering depths of the set of objects from a camera perspective, the hit map storing indications of which pixels will be sampled for which of the plurality of cascades. The method also comprises generating a plurality of shadow maps corresponding to the plurality of cascades by rendering a first subset of the objects from a light perspective based on the hit map, the plurality of shadow maps excluding a second subset of the objects that are not in the first subset of the objects, rendering the set of objects from the camera perspective for display, and shading a set of pixels that are in shadow based on the plurality of shadow maps.

Another example can include any of the above and/or below examples where the method further comprises receiving at least one of a position or a direction of a light.

Another example can include any of the above and/or below examples where the method further comprises receiving at least one of a position or a direction of a camera.

Another example can include any of the above and/or below examples where the method further comprises defining a view frustum based on the camera.

Another example can include any of the above and/or below examples where the method further comprises defining a plurality of subfrusta corresponding to the plurality of cascades, the plurality of subfrusta splitting the view frustum.

Another example can include any of the above and/or below examples where the indications are masks including cascade bits.

Another example can include any of the above and/or below examples where generating the plurality of shadow maps comprises culling the set of objects by checking the cascade bits in the hit map to determine which of the set of objects to include in which of the plurality of shadow maps.

Another example can include any of the above and/or below examples where generating the plurality of shadow maps comprises culling the set of objects to determine which of the set of objects are in which of the plurality of cascades.

Another example can include any of the above and/or below examples where the second subset of the objects are not rendered from the light perspective based on the hit map when generating the plurality of shadow maps.

Various examples have been described above. Although the subject matter has been described in language specific to example structural features and/or methodological acts, the subject matter defined in the appended claims is not necessarily limited to the specific features or acts described above. Rather, the specific features and acts described above are presented as example forms of implementing the claims, and other features and acts that would be recognized by one skilled in the art are intended to be within the scope of the claims.

The invention claimed is:

1. A computer readable storage medium storing instructions which, when executed by a processor, cause the processor to:
   receive a command to display a set of objects;
   generate a hit map that indicates a first subset of the objects for which shadow tests will be performed;
   cull the set of objects based on the hit map to determine which of the set of objects to include in or exclude from a plurality of shadow maps for a plurality of cascades;
   project bounding boxes surrounding the set of objects into a shadow map space;
   sample the hit map at vertices of the projected bounding boxes;
   generate the plurality of shadow maps for the plurality of cascades, the shadow maps excluding a second subset of the objects based on the hit map; and
   render the set of objects and shadows from a camera view based on the shadow maps.

2. The computer readable storage medium of claim 1, wherein generating the hit map comprises:
   rendering a depth buffer of the set of objects from the camera view.

3. The computer readable storage medium of claim 2, wherein generating the hit map further comprises:
   projecting pixels in the depth buffer into a shadow map space using a world-to-shadow matrix.

4. The computer readable storage medium of claim 1, wherein the hit map includes pixels and stores a mask including cascade bits for each pixel.

5. The computer readable storage medium of claim 1, wherein culling the set of objects comprises:
   including the first subset of the objects in the shadow maps in response to sampling the hit map.

6. The computer readable storage medium of claim 1, wherein culling the set of objects comprises:
   excluding the second subset of the objects from the shadow maps in response to sampling the hit map.

7. A system, comprising:
   a processor; and
   storage storing instructions which, when executed by the processor, cause the processor to:
   receive locations of a set of objects;
   render a depth buffer of the set of objects from a camera view;
   project pixels in the depth buffer into a shadow map space using a world-to-shadow matrix to generate a hit map including pixels and indications of whether shadow tests will be performed for the pixels;
   generate shadow maps by rendering the set of objects from a light perspective, the shadow maps excluding a subset of the objects that will not have shadow tests performed based on the hit map; and
   render the set of objects from a camera perspective, the shadow maps being used to determine which pixels of the set of objects are in shadow.

8. The system of claim 7, wherein the indications in the hit map are masks including cascade bits for each pixel in the hit map.

9. The system of claim 8, wherein the cascade bits determine whether to include or exclude the set of objects from the shadow maps.

10. A method, comprising:
    receiving a set of objects;
    defining a plurality of cascades;
    generating a hit map by rendering depths of the set of objects from a camera perspective, the hit map storing indications of which pixels will be sampled for which of the plurality of cascades;
    projecting bounding boxes surrounding the set of objects into a shadow map space;
    sampling the hit map at vertices of the projected bounding boxes;
    generating a plurality of shadow maps corresponding to the plurality of cascades by rendering a first subset of the objects from a light perspective based on sampling the hit map, a second subset of the objects that are not in the first subset of the objects not being rendered from the light perspective based on sampling the hit map when generating the plurality of shadow maps, the plurality of shadow maps including the first subset of the objects and excluding the second subset of the objects in response to sampling the hit map;
    rendering the set of objects from the camera perspective for display; and
    shading a set of pixels that are in shadow based on the plurality of shadow maps.

11. The method of claim 10, further comprising:
    receiving at least one of a position or a direction of a light.

12. The method of claim 10, further comprising:
    receiving at least one of a position or a direction of a camera.

13. The method of claim 12, further comprising:
    defining a view frustum based on the camera.

14. The method of claim 13, further comprising:
    defining a plurality of subfrusta corresponding to the plurality of cascades, the plurality of subfrusta splitting the view frustum.

15. The method of claim 10, wherein the indications are masks including cascade bits.

16. The method of claim 15, wherein generating the plurality of shadow maps comprises:
   culling the set of objects by checking the cascade bits in the hit map to determine which of the set of objects to include in which of the plurality of shadow maps.

17. The method of claim 10, wherein generating the plurality of shadow maps comprises:
   culling the set of objects to determine which of the set of objects are in which of the plurality of cascades.

18. The computer readable storage medium of claim 4, wherein the cascade bits determine whether to include or exclude the set of objects from the plurality of shadow maps.

19. The system of claim 7, further comprising:
   a graphics card including memory for storing the hit map.

20. The method of claim 10, further comprising:
   storing the hit map as a texture image.

* * * * *